United States Patent [19]
Kim et al.

[11] Patent Number: 5,710,981
[45] Date of Patent: Jan. 20, 1998

[54] PORTABLE RADIO POWER CONTROL DEVICE AND METHOD USING INCREMENTALLY DEGRADED RECEIVED SIGNALS

[75] Inventors: Seung Kil Kim, Chapel Hill; Yongbing Wan, Cary, both of N.C.

[73] Assignee: Ericsson Inc., Research Triangle Park, N.C.

[21] Appl. No.: 447,600

[22] Filed: May 23, 1995

[51] Int. Cl.$^6$ .................................................. H04B 7/00
[52] U.S. Cl. .......................... 455/69; 455/89; 455/127
[58] Field of Search ............................ 455/33.1, 54.1, 455/56.1, 68, 69, 89, 226.3, 127; 379/58, 59

[56] References Cited

U.S. PATENT DOCUMENTS

| | | | |
|---|---|---|---|
| 3,732,496 | 5/1973 | Boyer | 325/62 |
| 4,004,224 | 1/1977 | Arens et al. | 325/2 |
| 4,165,493 | 8/1979 | Harrington | 330/270 |
| 4,220,923 | 9/1980 | Pelchat et al. | 455/295 |
| 4,309,771 | 1/1982 | Wilkens | 375/58 |
| 4,363,127 | 12/1982 | Evans et al. | 375/30 |
| 4,392,245 | 7/1983 | Mitama | 455/115 |
| 4,613,990 | 9/1986 | Halpern | 455/33 |
| 4,777,653 | 10/1988 | Bonnerot et al. | 455/69 |
| 4,811,421 | 3/1989 | Havel et al. | 455/69 |
| 5,128,965 | 7/1992 | Henriksson | 375/58 |
| 5,129,098 | 7/1992 | McGirr | 455/69 |
| 5,241,690 | 8/1993 | Larsson et al. | 455/54.1 |
| 5,278,992 | 1/1994 | Su et al. | 455/69 |
| 5,283,784 | 2/1994 | Genter | 370/32.1 |
| 5,293,639 | 3/1994 | Wilson et al. | 455/17 |
| 5,333,175 | 7/1994 | Ariyavisitakul et al. | 379/58 |
| 5,386,589 | 1/1995 | Kanal | 455/33.1 |
| 5,465,399 | 11/1995 | Oberholtzer | 455/69 |
| 5,506,869 | 4/1996 | Royer | 455/69 |
| 5,574,982 | 11/1996 | Almgreen et al. | 455/69 |
| 5,574,984 | 11/1996 | Reed et al. | 455/96.1 |

FOREIGN PATENT DOCUMENTS

| | | | |
|---|---|---|---|
| 312690 | 4/1989 | European Pat. Off. | H04B 7/26 |
| 4001810 | 7/1991 | Germany | H04B 1/40 |
| 5535569 | 3/1980 | Japan | H04B 1/40 |
| 6195626 | 5/1986 | Japan | H04B 1/04 |
| 61135234 | 6/1986 | Japan | H03M 13/12 |
| 17722 | 1/1989 | Japan | |
| 1105624 | 4/1989 | Japan | H04B 1/40 |
| 2148920 | 7/1990 | Japan | H04B 1/04 |
| 2192231 | 7/1990 | Japan | H04B 7/26 |
| 2215238 | 8/1990 | Japan | H04B 7/26 |
| 3258124 | 11/1991 | Japan | H04B 1/40 |
| 3280727 | 12/1991 | Japan | H04B 7/155 |
| 418820 | 1/1992 | Japan | H04B 7/005 |
| 9208297 | 5/1992 | WIPO | H04B 7/00 |

*Primary Examiner*—Edward F. Urban
*Attorney, Agent, or Firm*—David G. Matthews

[57] ABSTRACT

A portable radio having a transmitter power controller connected to the portable radio's receiver and transmitter for controlling the power transmission level of the portable radio, resulting in reduced power consumption by the portable radio and extended battery life. The transmitter power controller estimates the signal strength and quality of the down-link signal by determining a threshold adjustment parameter for the received signal. Thus, this invention eliminates false power adjustment caused by the interfering signals when RSSI (Received Signal Strength Level) is used as a means to estimate transmitter power level. The threshold adjustment parameter is an adjustment parameter used in adjusting the received signal to produce a degraded signal having a predetermined signal quality, and is determined by incrementally adjusting the received signal until the degraded signal is determined to have the predetermined signal quality. The received signal is adjusted in one embodiment by adding noise to the received signal and in another embodiment by adjusting the bias voltage of an RF amplifier and IF amplifier in the receiver. The threshold adjustment parameter corresponds to the signal strength and quality of the received signal, and a look-up table approach is used in determining and adjusting the power transmission level for the portable radio.

18 Claims, 6 Drawing Sheets

PORTABLE RADIO POWER CONTROL DEVICE AND METHOD USING INCREMENTALLY DEGRADED RECEIVED SIGNALS

FIELD OF THE INVENTION

The present invention relates generally to portable radios, and more particularly to portable radios having a method and apparatus for controlling transmission power.

BACKGROUND OF THE INVENTION

Portable radios are typically powered by rechargeable batteries to enable communications in different locations without requiring an external power supply. The rechargeable batteries, however, can only power the portable radios for a limited amount of time before becoming discharged. After becoming discharged, a user must go to the inconvenience of replacing the discharged battery with a charged battery. The amount of time a rechargeable battery can power a portable radio before becoming discharged is often referred to as the battery life or talk time of the battery. The talk time that a rechargeable battery provides a portable radio is a critical design feature, and there is a great need to extend the talk time that batteries can provide.

Talk time or battery life is determined in large part by the average power at which the transmitter of the portable radio transmits information signals over an up-link channel. Information signals transmitted over an up-link channel can be analog or digital and the transmitted signals are referred to as up-link signals. The power at which a portable radio must transmit to establish a satisfactory communication link varies depending on the distance between the portable radio and the base station receiving the transmitted signal. Higher transmission powers are needed to provide a satisfactory communication link as the distance increases, lower transmission powers are needed as the distance decreases.

By effectively adjusting the transmitter power depending on the location of the portable radio relative to the base station, the average transmission power is decreased, and accordingly, battery life and talk time is extended. Battery life is extended because the portable radio is prevented from transmitting at unnecessary high transmission powers when the portable radio is close to the base station. Adjusting the transmission power also provides the benefit of reducing the interference level to other users caused when portable radios transmit at unnecessarily high power levels.

There are two general ways of controlling the transmission power level of a portable radio—closed-loop power control and open-loop power control. In general, the purpose of both the open-loop and closed-loop power control schemes is to increase the transmission power level of the portable radio as the distance between the portable radio and the base station increases, and to decrease the transmission power level as the distance between the portable radio and the base station decreases.

In a closed-loop power control system, the base station controls the transmission power of the portable radio by transmitting power control messages to the portable radio over a down-link channel. These messages or information signals transmitted over the down-link channel can be analog or digital and the transmitted signals are referred to as down-link signals. The base station monitors the received signal power from the portable radio by making an RSSI (received signal strength indicator) measurement for the up-link channel. Based on the RSSI measurement, a power control signal is determined. This power control signal is then sent to the portable radio over the down-link channel and is used to adjust the transmitter power of the portable radio. The closed-loop power control system provides satisfactory power control, but this system cannot be used to control the power of portable radios used in simplex or half-duplex systems where a single radio frequency channel links a portable radio with a base station. The closed-loop power control system also has the disadvantage of adding data overhead to the communication link by requiring power control messages to be transmitted from the base station to the portable radio.

Open-loop power control systems provide for power control of a portable radio without requiring power control messages to be transmitted from the base station to the portable radio. Instead, in open-loop power control systems the portable radio typically monitors the received signal strength level (RSSI) of a down-link signal transmitted from the base station and adjusts the portable radio's transmission power based on the monitored received signal strength. In effect, the received signal strength acts as an estimate of the distance between the portable radio and the base station, and the transmission power level of the portable radio is adjusted based of this estimate. The open-loop power control system is advantageous because it is more suitable for half-duplex systems, such as land mobile portable radio systems, and does not increase the data overhead of the communication link between the portable and the base station.

The problem with open-loop power control systems using received signal strength to determine transmission power level is that received signal strength does not provide a reliable estimation of distance between a portable radio and a base station. Received signal strength is unreliable because interfering signals received at the portable radio can affect the signal strength measurement.

A portable radio having a more reliable open-loop power control system is needed.

SUMMARY OF THE INVENTION

The invention provides a portable radio having an improved open-loop power control scheme, resulting in reduced power consumption by the portable radio and extended battery life. The portable radio includes a transmitter power controller connected to a radio receiver and transmitter for controlling the power transmission level of the portable radio. The transmitter power controller adjusts the transmission power level of the portable radio based on an estimate of the signal strength and quality of a down-link signal transmitted and received at the portable radio.

In the power control scheme of the present invention, the transmitter power controller estimates the signal strength and quality of the received down-link signal by determining a threshold adjustment parameter for the received signal. The threshold adjustment parameter is determined by incrementally degrading the received signal until a degraded signal is detected having a predetermined signal quality. The adjustment of the received signal is controlled with adjustment parameters. The adjustment parameter associated with the degraded signal having the predetermined signal quality is the threshold adjustment parameter. Depending on the signal strength and quality of the received signal, the threshold adjustment parameter will vary. The threshold adjustment parameter corresponds to the signal strength and quality of the received signal, and is used to determine the transmission power level for the portable radio.

The transmitter power controller includes a timing circuit, data detector and signal adjuster. The timing circuit triggers the transmitter power controller to periodically redetermine the threshold adjustment parameter. The data detector and signal adjuster together determine the threshold adjustment parameter by using an iterative process. The signal adjuster adjusts the received signal using a selected adjustment parameter to produce a degraded signal. The degraded signal is measured by the data detector to determine if the degraded signal has the predetermined signal quality. The signal quality of the degraded signal can be measured using a CRC (cyclical redundancy check) or BER (bit error rate) measurement. If the degraded signal does not have the predetermined signal quality, the signal adjuster is signaled to incrementally increase or decrease the selected adjustment parameter and to adjust the received signal based on the incrementally-adjusted adjustment parameter to produce an incrementally increased or decreased degraded signal. The received signal is incrementally adjusted in this manner until the data detector determines that the degraded signal has a predetermined signal quality. The adjustment parameter associated with this degraded signal is the threshold adjustment parameter.

In the first preferred embodiment, the signal adjuster includes a noise source and scaling parameter unit for incrementally degrading the received signal. The noise generator generates noise and the adjustment parameter unit incrementally scales the generated noise using incremental adjustment parameters. The threshold adjustment parameter is determined by adding incrementally-scaled noise to the received signal until the data detector detects a degraded signal having the predetermined signal quality. The adjustment parameter associated with this degraded signal is the threshold adjustment parameter for the received signal.

In a second preferred embodiment, the signal adjuster includes a biasing unit connected to a biasing circuit for an RF amplifier and IF amplifier in the receiver. The biasing unit controls the biasing circuit with adjustment parameters that correspond with biasing voltages so as to adjust the bias voltage, which in turn changes gain of the RF and IF amplifiers. The threshold adjustment parameter is determined by successively incrementing the bias voltage of the amplifiers until the data detector detects a degraded signal having the predetermined signal quality. The adjustment parameter associated with this degraded signal is the threshold adjustment parameter for the received signal.

In both the first and second embodiments, the threshold adjustment parameter is inputted to the amplifier controller. To determine the transmission power level, the amplifier controller accesses a look-up table having a range of adjustment parameters and corresponding transmission power levels. The transmission power level corresponding to the threshold adjustment parameter is selected from the look-up table and used in adjusting the transmission power level for the portable radio.

Because the portable radio of the present does not use RSSI measurements in making transmission power adjustments, interfering signals at the portable radio do not adversely affect accuracy of the transmission power adjustments. Thus, the portable radio of the present invention eliminates false transmission power adjustment caused by interfering signals.

BRIEF DESCRIPTION OF THE DRAWINGS

The invention will now be described by means of exemplifying embodiments with reference to the attached drawings, wherein.

DETAILED DESCRIPTION OF THE PREFERRED EMBODIMENTS

Figure 1:
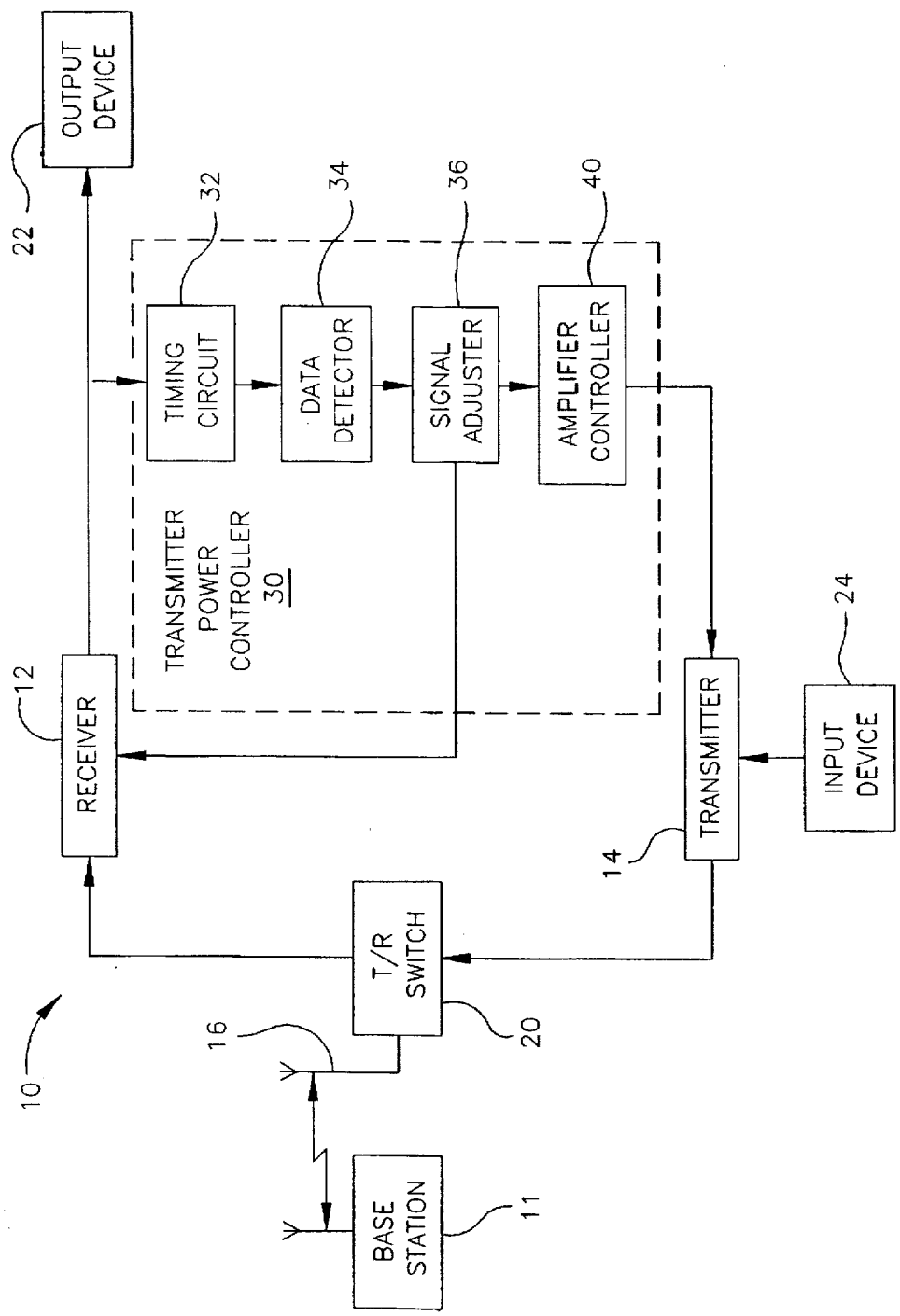
FIG. 1 shows a general block diagram of a portable radio according to the invention.

Referring now to the drawings, a portable radio providing for reduced power consumption and longer battery life is shown therein and indicated generally by the numeral 10. Reduced power consumption and longer battery life is provided through improved control of the transmission power level of the portable radio 10. In general, transmission power for the portable radio 10 is decreased as the portable radio 10 moves closer to a base station 11 and is increased as the portable radio 10 moves further away from the base station 11. The portable radio 10 is particularly intended to operate in a simplex or half-duplex communications system, such as a land mobile portable radio system. Portable radio 10 can also be operated in a cellular full-duplex communications system.

Referring to FIG. 1, portable radio 10 includes a conventional receiver 12, transmitter 14, antenna 16, T/R switch 20, output device 22, and input device 24. The antenna 16 receives from base station 11 an information or down-link signal transmitted over a down-link channel formed by a selected carrier frequency. In the preferred embodiments of the present invention, the down-link signal is transmitted to the portable radio 10 by modulating the selected carrier frequency using a digital modulation technique. The down-link signal received by antenna 16 is directed to receiver 12 by a transmitter/receiver T/R switch 20. Receiver 12 processes the received signal in a conventional manner and outputs a baseband signal to an output device 22 which can be a speaker, facsimile machine, or computer. Transmitter 14 also processes in a conventional manner input signals from input device 24 which can be a microphone, facsimile machine, or computer. The processed input signals are transmitted to the base station 11 via T/R switch 20 and antenna 16.

A transmitter power controller 30 is coupled to the receiver 12 and transmitter 14 for controlling the transmission power level of transmitter 14 based on an estimation of the signal strength and quality of the received signal transmitted over a selected, down-link channel. In the preferred embodiments, transmitter power controller 30 estimates the signal strength and quality of the down-link signal transmitted over a control channel. The operations performed by transmitter power controller 30 can all be performed by configuring a standard microprocessor currently used for portable radios.

FIG. 1 shows a general functional block diagram of the transmitter power controller 30. As shown in FIG. 1, the transmitter power controller 30 generally includes a timing circuit 32, data detector 34, signal adjuster 36, and an amplifier controller 40. The timing circuit 32 initiates measurement periods periodically while the portable radio 10 is being used. In the preferred embodiment, the timing circuit 32 initiates a measurement period at between one to five second or other pre-determined intervals.

During a measurement period, the data detector 34 and signal adjuster 36 work in conjunction to determine a threshold adjustment parameter for the received signal. The data detector 34 and signal adjuster 36 determine the threshold adjustment parameter by incrementally degrading the received signal (i.e., adjusting the signal-to-noise ratio of the received signal) and measuring the degraded signal, respectively, until a predetermined signal quality for the degraded signal is detected. The signal adjuster 36 makes the incremental adjustments to the received signal by using a sequence of incremental adjustment parameters $\alpha_1, \alpha_2, \ldots \alpha_n$. The adjustment parameter associated with the degraded signal detected to have the predetermined signal quality is the threshold adjustment parameter for the received signal. Depending on the signal strength and quality of the received signal, the adjustment parameter required to adjust the received signal sufficiently to produce a degraded signal having the predetermined signal quality will vary. Accordingly, the threshold adjustment parameter is related to the signal strength and quality for the received signal. The amplifier controller 40 uses the threshold adjustment parameter to determine a transmission power level and then adjust the transmission power level for the portable radio 10.

Figure 2:
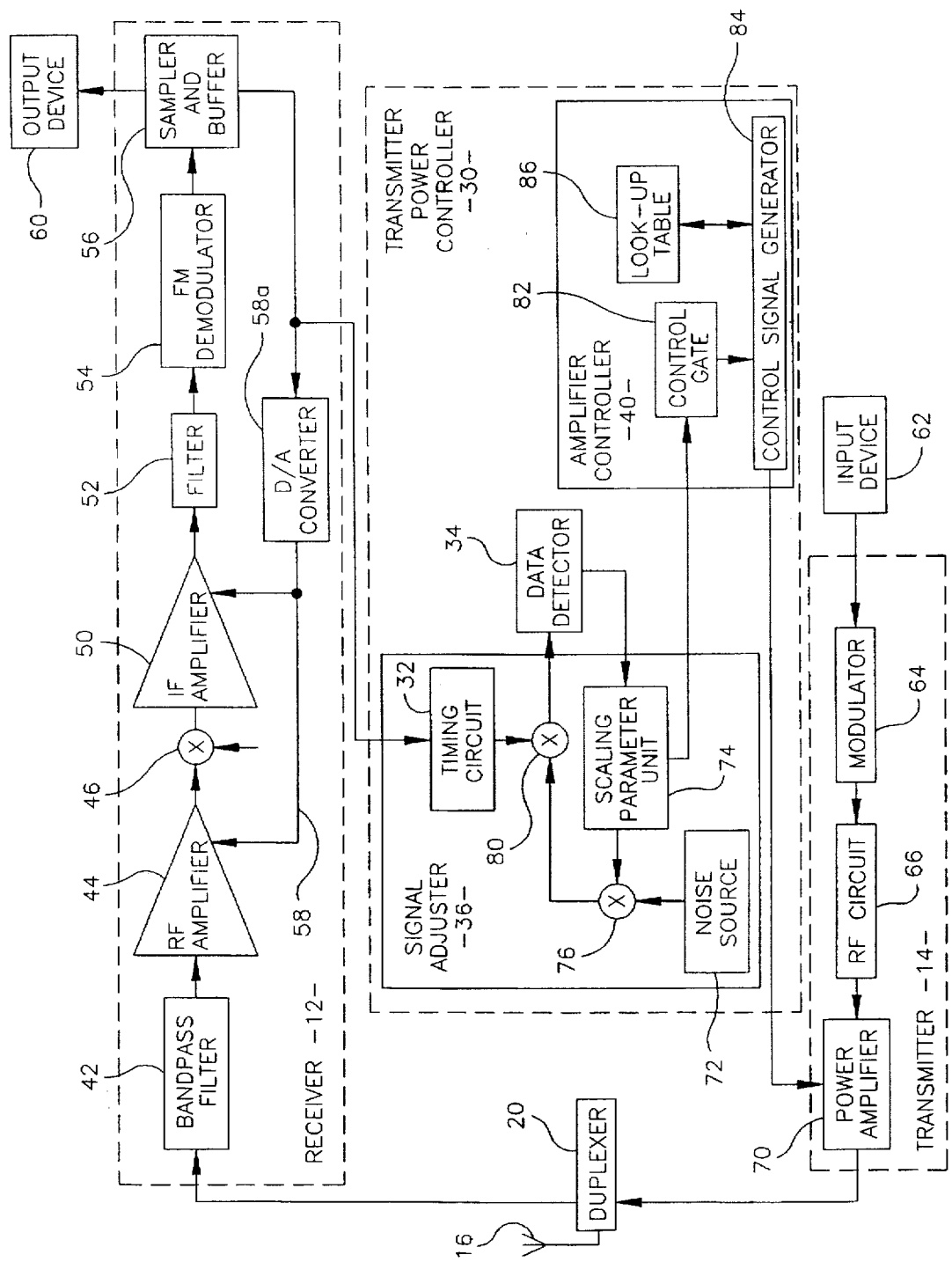
FIG. 2 shows a block diagram of a first embodiment of a portable radio according to the invention.

Turning to FIG. 2, a first preferred embodiment of portable radio 10 is shown. Transmitter power controller 30 is connected to a receiver 12 and transmitter 14 adapted to receive and transmit, respectively, modulated signals containing digital information signals. Receiver 12 includes a bandpass filter 42, a radio frequency (RF) amplifier 44, a down converter 46, an intermediate frequency (IF) amplifier 50, a filter 52, a demodulator 54, and a sampler and buffer 56. Transmitter 14 includes a frequency modulator 64, a radio frequency (RF) circuit 66, and a power amplifier 70. Both receiver 12 and transmitter 14 operate in a conventional manner during normal communications with base station 11. An overview of these operations is described below.

A down-link signal transmitted from base station 11 over a down-link channel is received by antenna 16, and is directed to the bandpass filter 42 by T/R switch 20. Bandpass filter 42 filters the received signal and directs the filtered signal to RF amplifier 44. The RF amplifier 44 amplifies the filtered signal and outputs the amplified signal to downconverter 46 which downconverts the amplified signal to a lower frequency band. The downconverted signal is then amplified by IF amplifier 50 and outputted to filter 52. Filter 52 filters the further-amplified signal and this signal is outputted to demodulator 54. The output signal of demodulator 54 is digitized by a sampler and buffer 56 and the digital signal is outputted to the output device 60 and the transmitter power controller 30.

Transmitter 14 operates to process and transmit input signals from input device 62. In particular, input device 62 outputs an information signal to modulator 64. Frequency modulator 64 modulates the processed information signal and outputs the modulated signal to RF circuit 66. The RF circuit 66 filters and amplifies the modulated signal and outputs the processed and modulated signal to power amplifier 70. Power amplifier 70 amplifies the processed modulated signal and an up-link signal is transmitted from antenna 16 to base station 11. The power level at which the up-link signal is to be transmitted from transmitter 14 is determined by power amplifier 70.

Figure 3:
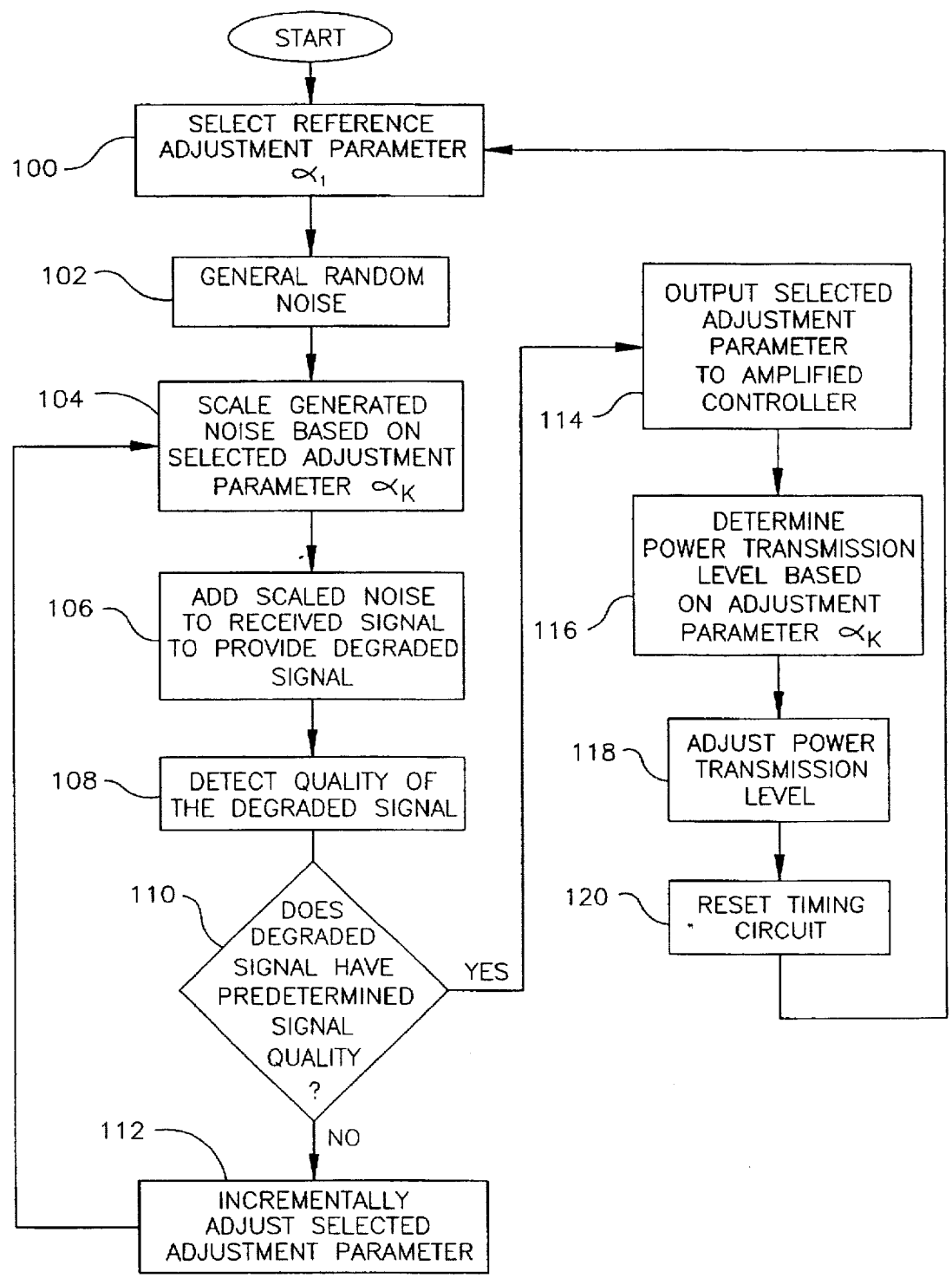
FIG. 3 shows a general flowchart of the operations of the transmitter power controller for a portable radio according to the first embodiment of the invention.

Transmitter power controller 30 is used to adjust the power level of power amplifier 70 based on an estimate of the signal strength and quality of the received signal transmitted over the down-link channel. By controlling the power level of power amplifier 70, the transmitter power controller 30 controls the transmission power level of transmitter 14. In the first preferred embodiment, the transmitter power controller 30 includes timing circuit 32, data detector 34, signal adjuster 36, and amplifier controller 40. The signal adjuster 36 includes noise source 72, adjustment or scaling parameter unit 74, scaler 76, and adder 80. The operation of the transmitter power controller 30 of the first preferred embodiment in adjusting the transmission power level of portable radio 10 is described below with reference to the flowchart of FIG. 3.

During normal operations of portable radio 10 of the first preferred embodiment, timing circuit 32 initiates a measurement period in which the transmission power level of portable radio 10 is readjusted. In the measurement period, a reference adjustment parameter $\alpha_1$, is initially selected as the adjustment parameter for the adjustment parameter unit 74 (block 100). Noise source 72 generates random noise at a selected power level (block 102). The random noise generated can have a variety of different distributions including Gaussian and uniform distributions. Scaler 76 selectively scales the generated noise based on the selected adjustment parameter $\alpha_k$ (where k represents the number of scaling iterations performed) stored in the adjustment parameter unit 74 and outputted to scaler 76 (block 104). Accordingly, adjustment parameters correspond to scaling parameters or factors. The adjustment parameter $\alpha_k$ selected during the first iteration of scaling the generated noise is the reference adjustment parameter $\alpha_1$.

The scaled noise is outputted to adder 80 which adds the scaled noise to the received signal to produce a degraded or adjusted signal (block 106). More specifically, the scaled noise is added to the received signal outputted from receiver 12 to adder 80. By adding noise to the received signal, the signal-to-noise ratio (SNR) and the quality of the received signal is degraded.

The degraded signal from adder 80 is outputted to data detector 34. Data detector 34 detects the quality of the degraded signal (block 108). The quality of the degraded signal is checked by a cyclical redundancy check (CRC), bit error rate (BER) measurement, or other signal quality measurement. Based on the quality check, the degraded signal is determined to have either met the predetermined signal quality or not to have met the predetermined signal quality (block 110). If a CRC check is used to detect signal quality, the data detector 34 determines if the degraded signal has a sufficient quality to pass the CRC check. A degraded signal passing the CRC check meets the predetermined signal quality and a degraded signal failing the CRC check does not meet the predetermined signal quality.

If a BER check is used to detect signal quality, the data detector 34 detects the BER of the degraded signal and compares the detected BER to a reference BER. Based on this comparison, the degraded signal is determined to either have met or not met the predetermined signal quality. The reference BER in the preferred embodiment can range from 1% to 5%.

If the predetermined signal quality has not been met, an increment signal is sent to the adjustment parameter unit 74 and a second iteration of adjusting the received signal is performed. In particular, the adjustment parameter unit 74 increments the selected adjustment parameter $\alpha_1$ to produce a new selected adjustment parameter α2 (block 112). The selected adjustment parameter α2 can be selected from a stored sequence of adjustment parameters or can be generated by incrementing the previously-selected adjustment parameter α1. In the first preferred embodiment, the selected adjustment parameter α2 is a scaling factor that is incrementally smaller than the previously-selected adjustment parameter α1.

During a second iteration, scaler 76 adjusts the generated noise from noise source 72 based on the selected adjustment parameter α2. Because the selected adjustment parameter α2 is a smaller scaling factor, the scaler 76 outputs scaled noise at a decreased power level compared to the first iteration. As discussed for the first iteration, the scaled noise of the second iteration is added to the received signal. Because the scaled noise of the second iteration is at a decreased power level, the degraded signal produced should have an improved signal quality compared to the degraded signal of the first iteration.

The iterative process of incrementally degrading the received signal with selected adjustment parameters $\alpha_1, \alpha_2, \ldots \alpha_n$ (where $\alpha_1 > \alpha_2 \ldots > \alpha_n$) is continued until the data detector 34 determines that a degraded signal produced at a k-th iteration meets the predetermined signal quality. Because of the sequential selection of decreasing adjustment parameters, the degraded signal for each subsequent iteration should have an incrementally improved signal quality. Accordingly, after a particular number of iterations, determined by the strength and quality of the received signal, a degraded signal will be produced and detected to have the predetermined signal quality.

When the data detector 34 determines that the degraded signal has the predetermined signal quality, the iterative process of incrementally degrading the received signal is completed and a threshold-met signal is outputted to adjustment parameter unit 74 and amplifier controller 40. In response to the threshold-met signal, the adjustment parameter unit 74 outputs to amplifier controller 40 the selected adjustment parameter used to produce the degraded signal having the predetermined signal quality (block 114). The selected adjustment parameter associated with the degraded signal having the predetermined signal quality is the threshold adjustment parameter.

The amplifier controller 40 uses the threshold adjustment parameter to determine the power transmission level for portable radio 10 (block 116). Amplifier controller 40 includes a control gate 82, a control signal generator 84, and a look-up table 86. The control gate 82 inputs the threshold adjustment parameter in response to the threshold-met signal from the data detector 34. Control signal generator 84 uses the threshold adjustment parameter to determine an amplifier power level for power amplifier 70 of radio transmitter 14. The power amplifier level is determined by accessing a look-up table 86. Look-up table 86 includes a range of potential adjustment parameters and associated amplifier power levels.

The control signal generator 84 retrieves the power amplifier level associated with the threshold adjustment parameter and generates a corresponding power-level signal. The power-level signal is outputted to the power amplifier 70 to adjust the amplification level of power amplifier 70 and determine the transmission power level of up-link signals transmitted from the portable radio 10 over an up-link channel (block 118). After the transmission power level of portable radio 10 has been adjusted, the timing circuit 32 is reset so as to initiate another measurement period after the selected time interval (block 120).

Figure 4:
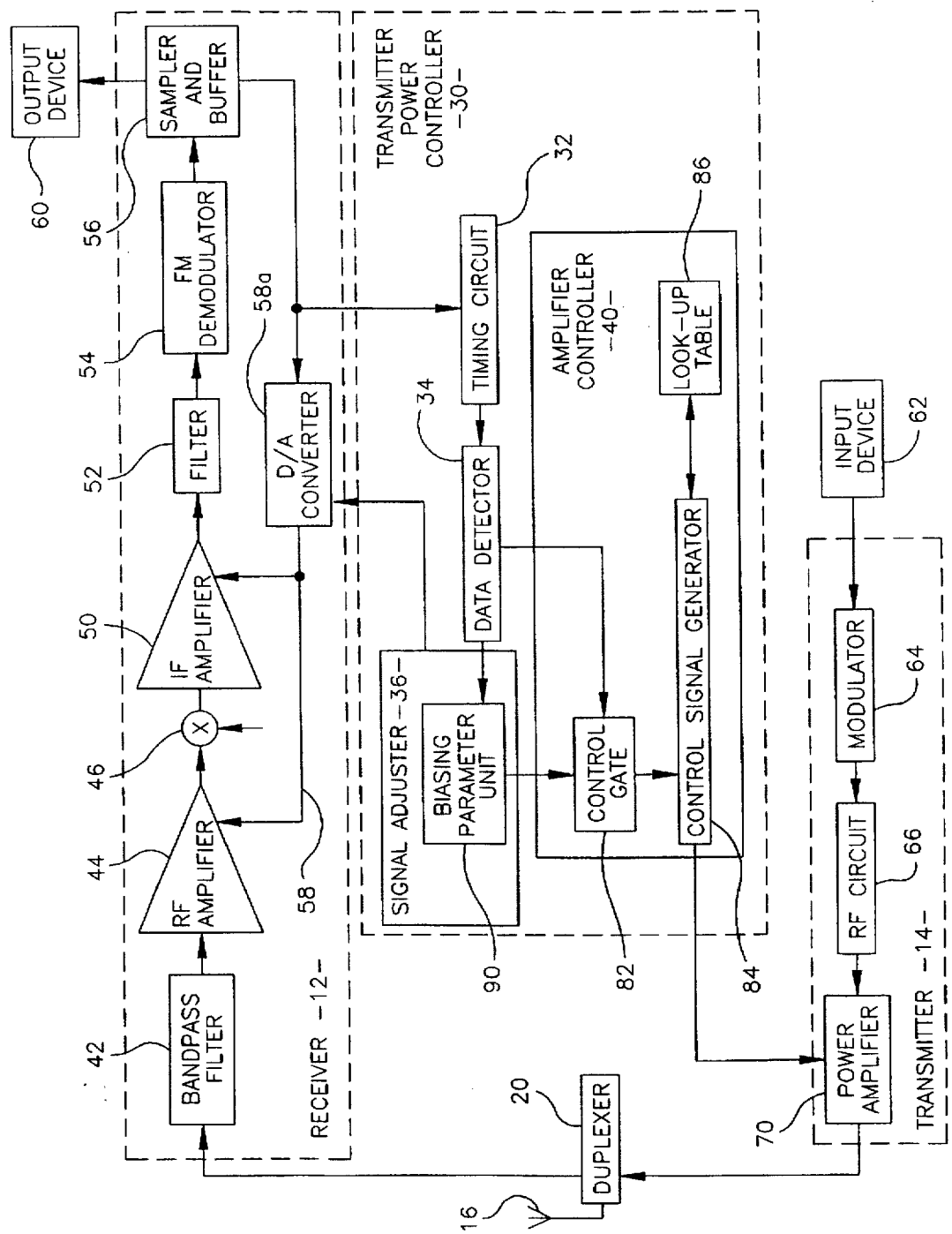
FIG. 4 shows a block diagram of a second embodiment of a portable radio according to the present invention.

Referring to FIG. 4, a second preferred embodiment of the present invention is shown. The portable radio 10 of the second preferred embodiment includes a conventional transmitter 14, antenna 16, T/R switch 20, output device 60, and input device 62 that operate in the same manner as discussed with respect to the first preferred embodiment. The portable radio 10 of the second preferred embodiment further includes a receiver 12a that is different from the receiver 12 of the first preferred. Receiver 12a does not include a sampler and buffer 56 and includes a biasing circuit 58 having a digital-to-analog D/A converter 58a. Omission of a sampler and buffer from receiver 12a, results in the output signal from demodulator 54, which is preferably a frequency-modulated demodulator, being inputted into data detector 34 of the transmitter power controller 30. Data detector 34 of the second preferred embodiment is designed to handle the demodulated output signal without the requirement of processing by a discrete sampler and buffer.

In the second preferred embodiment, the transmitter power controller 30 estimates the quality and strength of a down-link signal received by receiver 12a in a manner different from the first embodiment. The signal adjuster 36 of transmitter power controller 30 includes a biasing or adjustment parameter unit 90 that is connected to the biasing circuit 58 to control the bias voltage and gain of the RF amplifier 44 and IF amplifier 50. In an alternate embodiment, the adjustment parameter unit 90 is connected to and only controls the gain of the RF amplifier. As described in connection with the flow chart of FIG. 5, during a measurement period the biasing parameter unit 90 is used in estimating the strength and quality of the received signal. Biasing parameter unit 90 does not control gain during normal operations of portable radio 10.

Figure 5:
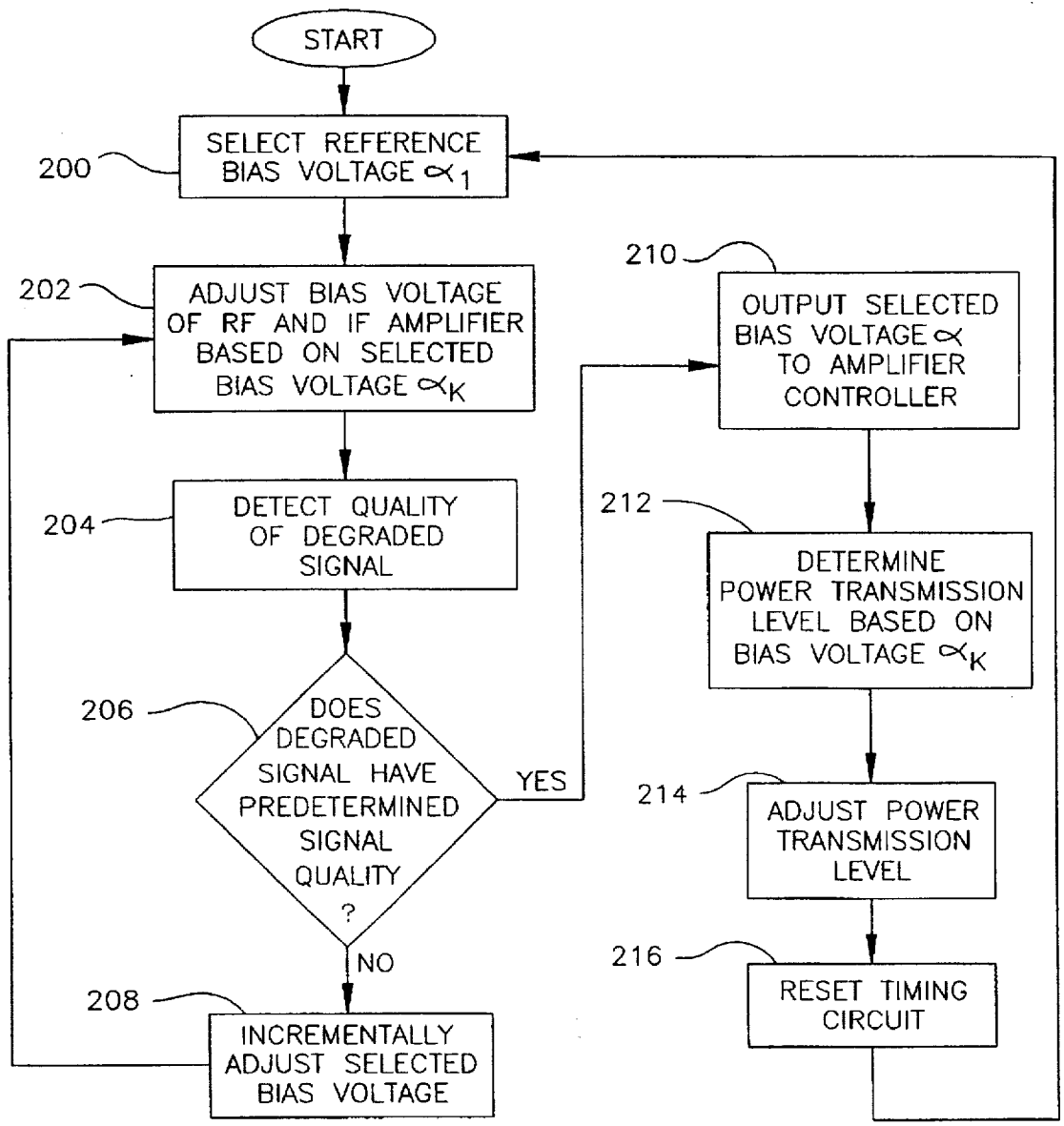
FIG. 5 shows a flowchart of the operations of the transmitter power controller of a portable radio according to the second embodiment of the invention.

Turning to the flow chart of FIG. 5, the operation of the second preferred embodiment is as follows. During normal operations of portable radio 10, timing circuit 32 initiates a measurement period. After initiation of the measurement period, a reference adjustment parameter or bias voltage α1 is selected as the adjustment parameter for the biasing unit 90 (block 200). The selected adjustment parameter corresponds to a biasing voltage for the IF and RF amplifiers 44, 50. The biasing unit 90 adjusts the bias voltage of the RF and IF amplifiers 44, 50 based on the selected bias voltage or adjustment parameter (block 202).

To adjust the bias voltage, the biasing unit 90 sends a biasing set digital data corresponding to the selected adjustment parameter 21 to D/A converter 58a. D/A converter 58a converts biasing set digital data into an analog biasing voltage and feeds it to the RF and IF amplifiers 44, 50. The biasing circuit 58 adjusts the bias voltage of the amplifiers 44, 50 to the selected bias voltage in response to the biasing data or signal. Adjusting the bias voltage of the RF and IF amplifiers 44, 50 results in the gain for the RF and IF amplifiers 44, 50 being adjusted.

The gain-adjusted amplifiers 44, 50 output a degraded signal that is demodulated and outputted to the data detector 34 of the transmitter power controller 30. The data detector 34 measures the signal quality of the degraded signal (block 204) and compares the measured signal quality to a predetermined signal quality (block 206). The data detector 34 preferably measures the BER of the degraded signal, but other signal quality checks such as a CRC check can be used. When BER is measured, the measured BER is compared to a reference BER in the range of 1% to 5%.

Figure 6:
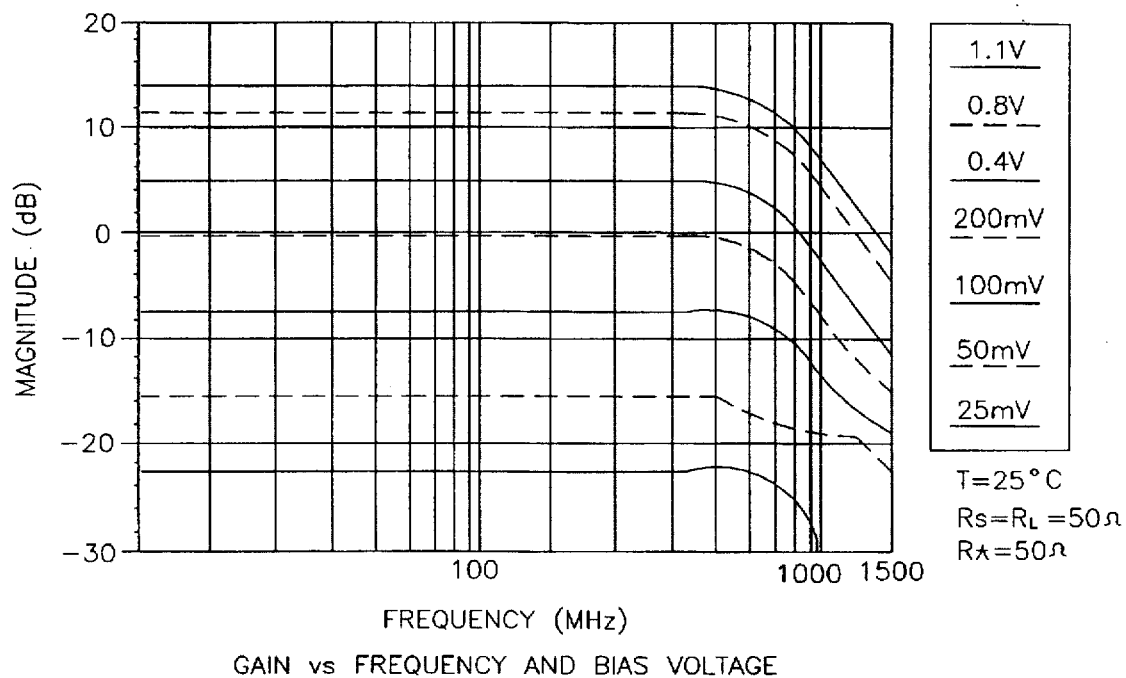
FIG. 6 shows a graph of receiver amplifier gain vs. frequency and bias voltage.
Figure 7:
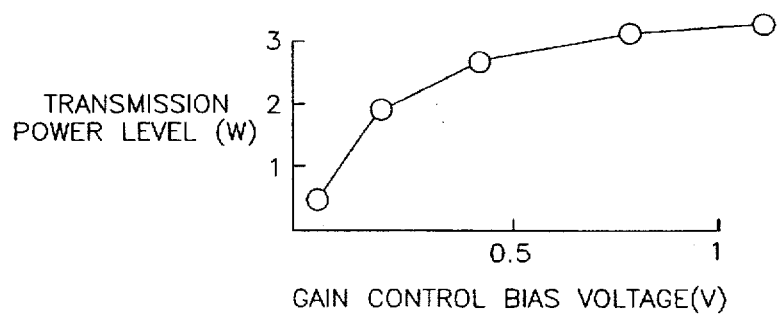
FIG. 7 shows a graph of transmission power level vs. bias voltage.

If the measured BER is less than the reference BER, the predetermined signal quality has not been met and the data detector 34 outputs an increment signal to the biasing unit 90. In response to the increment signal, the biasing unit 90 adjusts the selected bias voltage α1 by increasing the bias voltage by an incremental amount or by selecting a increased bias voltage from a sequence of stored bias voltages or adjustment parameters α1,α2, ... αn (where α1<α2<... <αn)(block 208). The biasing unit 90 during a second iteration increases the bias voltage of the RF and IF 90 amplifiers 44, 50 to bias voltage α2. The use of a increased bias voltage α2 for the RF and IF amplifiers 44, 50 results in the gain being increased for the received signal. As the gain is increased, the degradation of the received signal is decreased and the signal-to-noise ratio and quality of the degraded signal outputted to the data detector 34 is increased. A chart showing how amplifier gain is increased by increasing bias voltage over a selected frequency range is shown in FIG. 6.

The iterative improving of the quality of the received signal by incrementally increasing the bias voltage of the RF and IF amplifiers 44, 50 with selected adjustment parameters α1,α2, ... αn (where α1<α2<... <αn) is continued until the data detector 34 detects a degraded signal equal to or greater than the reference BER. This degraded signal is determined to have the predetermined signal quality. In the preferred embodiment, the biasing parameter unit 90 provides for about 30 dB gain control.

When the data detector 34 determines that the degraded signal has the predetermined signal quality, the iterative process of incrementally adjusting the received signal is completed and a threshold-met signal is outputted to adjustment parameter unit 74 and amplifier controller 40. In response to the threshold-met signal, the adjustment parameter unit 90 outputs the selected adjustment parameter associated with the degraded signal having the predetermined signal quality. The outputted adjustment parameter is the threshold adjustment parameter and the amplifier controller 40 accepts the outputted or threshold adjustment parameter (block 210). In a manner analogous to that described for the first preferred embodiment, the amplifier controller 40 uses the bias voltage to corresponding to the threshold adjustment parameter select the transmission power level of transmitter 14 by accessing a look-up table 86 (block 212), and adjusts the transmission power level based on this selected transmission power level (block 214). After the transmission power level of portable radio 10 has been adjusted, the timing circuit 32 is reset so as to initiate another measurement period after the selected time interval (block 216).

In both the first and second preferred embodiments, the adjustment parameters and their associated transmission power levels can be calculated empirically or by a calculation method. One method of calculating the adjustment parameters and associated transmission power levels contained in look-up table 86 for the first preferred embodiment is as follows:

Calculation of Adjustment Parameters and Corresponding Transmission Power Levels for First Preferred Embodiment The following describes a way of calculating scaling or adjustment parameters αk based on the power control levels. First, let (1) $S_{min}$ (dBm) be the minimum signal level;

(2) ΔPtx (dB) be the actual power control range;

(3) P1<P2<...<PM(W) be the actual power control levels;

(4) ΔPre(dB) be the receiver sensitivity range for power control;

This parameter represents a range corresponding to the actual power control range in terms of the receiver sensitivity range. For example, we want to transmit a signal power $P_1$ at the signal level of $S_{min}$+ΔPre; and (5) $SNR_{min}$ (dB) be the minimum working SNR level.

This parameter represents a measure of a good quality signal which will typically result in correctly detected data (such as a CRC check).

Then set the level of noise source to $$N_r = S_{min} + \Delta P_{re} - SNR_{min}.$$

The scaling parameters $α_k$'s are calculated as $$\alpha_k = 10^{-x_k}, X_k = \log_{10}\left(\frac{P_k}{P_1}\right) \cdot \frac{\Delta P_{re}}{2\Delta P_{tx}}.$$

In this way, the scaling parameters $α_k$ follow α1>α2>...>αn.

The receiver will use α1 for the first scaling iteration. If the detected data of the degraded signal is correct (i.e., has the predetermined signal quality), the transmitted power level will be set to $P_1$. Otherwise, the iterative technique will advance to the next smaller scaling parameter until an adjustment parameter αk (where k<x).produces a degraded signal having the predetermined signal quality. Then the transmitted power is set to $P_k$.

EXAMPLE CALCULATION

In this design example, the parameters of the open-loop power control technique of the first preferred embodiment are set as follows:

Smin=−90 dBm
ΔPtx=7.78 dB
Pk=0.5, 1.0, 1.5, 2.0, 2.5, 3.0 W
ΔPre=20 dB
SNRmin=15 dB.

Here ΔPre=20 dB means at the received signal level of $S_{min}$+ΔPre=−70 dBm, the transmitted power will be $P_1$=0.5 W. $P_6$=3 W will be transmitted at the received signal level of $S_{min}$=−90 dBm. $SNR_{min}$=15 dB is considered to be a noise level which results in the degraded signals ordinarily passing the CRC checks for an analog control channel.

Then, the noise level is $$Nr=-90+20-15=-85 \text{ dBm}.$$

The scaling parameters are calculated as follows:

α1=1 for $P_1$=0.5 W
α2=0.41 for $P_2$=1 W
α3=0.244 for $P_3$=1.5 W
α4=0.168 for $P_4$=2 W
α5=0.126 for $P_5$=2.5 W
α6=0.1 for $P_6$=3 W.

While the present invention has been described with respect to a portable radio for transmitting and receiving analog information signals in a half duplex communication system, those skilled in the art will recognize that the present invention is also applicable to a portable radio for transmitting and receiving digital signals and that the present invention is not limited to the specific embodiments described and illustrated herein. It will be appreciated by those of ordinary skill in the art that the present invention can be embodied in other specific forms without departing from the spirit or essential character thereof. The presently disclosed embodiments are therefore considered in all respects to be illustrative and not restrictive.

What is claimed is:

1. A radio having a receiver for receiving a down-link signal and having a transmitter for transmitting an up-link signal, the radio comprising:

a. signal adjusting means for incrementally adjusting the received signal to produce a degraded signal having a predetermined signal quality, wherein each incremental degradation of the received signal produces a degraded signal having an adjustment parameter associated therewith;

b. detecting means for detecting the degraded signal having the predetermined signal quality, wherein the adjustment parameter associated with the degraded signal having the predetermined signal quality is a threshold adjustment parameter; and c. means for determining the transmission power level for the radio based on the threshold adjustment parameter.

2. The radio of claim 1, wherein the signal adjusting means adjusts the received signal by adding noise at incremental power levels to the received signal.

3. The radio of claim 2, wherein the detecting means outputs a threshold-met signal in response to detecting a degraded signal having the predetermined signal quality and an increment signal in response to detecting a degraded signal not having the predetermined signal quality.

4. The radio of claim 3, wherein the signal adjusting means includes:

a. noise generating means for generating noise at a selected power level;

b. scaling means for scaling the generated noise to produce scaled noise at a selected power level based on a selected adjustment parameter, and wherein the adjustment parameters correspond to noise scaling parameters;

c. adding means for adding the scaled noise to the received signal to produce a degraded signal; and d. wherein the scaling means incrementally adjusts the selected adjustment parameter in response to increment signals so as to incrementally scale the generated noise and produce the degraded signal having the predetermined signal quality, and wherein a selected adjustment parameter is determined to be the threshold adjustment parameter in response to the threshold-met signal.

5. The radio of claim 1, wherein the receiver includes a receiver amplifier having a biasing circuit, and wherein the signal adjusting means incrementally adjusts the received signal by incrementally adjusting the gain of the receiver amplifier.

6. The radio of claim 5, wherein the gain of the amplifier is incrementally adjusted by incrementally adjusting the bias voltage of the biasing circuit, and wherein the adjustment parameters correspond to biasing voltages of the receiver amplifier.

7. The radio of claim 1, wherein the means for determining the transmission power level based on the threshold adjustment parameter includes accessing a look-up table having a range of adjustment parameters and corresponding amplifier power levels, wherein the amplifier power level corresponding to the threshold adjustment parameter is selected, and wherein the transmission power level of the radio is based on the selected amplifier power level.

8. The radio of claim 1, wherein the detecting means detects the signal quality of the degraded signals with a cyclical redundancy check, and wherein a degraded signal is determined to have the predetermined signal quality based on the cyclical redundancy check.

9. The radio of claim 1, wherein the detecting means detects the signal quality of the degraded signals by measuring the bit error rate of the degraded signals, and wherein the degraded signals are compared with a reference bit error rate to determine whether the degraded signal has the predetermined signal quality.

10. A method for receiving a down-link signal and for transmitting an up-link signal, the method comprising the steps of:

a. adjusting the received signal based on a selected adjustment parameter to produce a degraded signal;

b. determining if the degraded signal has a predetermined signal quality;

c. incrementally adjusting the selected adjustment parameter if the degraded signal does not have the predetermined signal quality;

d. repeating steps 10a, 10b, and 10c to produce a degraded signal having the predetermined signal quality, wherein the selected adjustment parameter associated with the degraded signal having the predetermined signal quality is a threshold adjustment parameter; and e. determining the transmission power level for the radio based on the threshold adjustment parameter.

11. The method of claim 10, wherein the step of adjusting the received signal includes the step of adding noise at a power level based on the selected adjustment parameter.

12. The method of claim 11, wherein the step of adjusting the received signal includes:

a. generating noise at a selected power level;

b. scaling the generated noise to produce scaled noise at a power level based on a selected adjustment parameter, wherein the adjustment parameters correspond to noise scaling parameters; and c. adding the scaled noise to the received signal to produce a degraded signal.

13. The method of claim 10, wherein the receiver includes a receiver amplifier having a biasing circuit, and wherein the step of adjusting the received signal includes adjusting the gain of the receiver amplifier based on the selected adjustment parameter.

14. The method of claim 13, wherein the gain of the amplifier is incrementally adjusted by incrementally adjusting the bias voltage of the biasing circuit, and wherein the adjustment parameters correspond to biasing voltages of the receiver amplifier.

15. The method of claim 10, wherein the step of determining the transmission power level for the radio based on the selected adjustment parameter includes accessing a look-up table having a range of adjustment parameters and corresponding amplifier power levels, wherein the amplifier power level corresponding to the threshold adjustment parameter is selected for the radio.

16. The method of claim 10, wherein the step of determining if the degraded signal has the predetermined signal quality includes the step of detecting the signal quality of the degraded signals with a cyclical redundancy check, wherein the degraded signal is determined to have the predetermined signal quality based on the cyclical redundancy check.

17. The method of claim 10, wherein the step of determining if the degraded signal has the predetermined signal quality includes the step of measuring the bit error rate of the degraded signals and comparing the measured bit error rate with a reference bit error rate to determine whether the degraded signal has the predetermined signal quality.

18. The method of claim 10, further including the step of periodically re-determining the transmission power level for the radio during operation of the radio.

* * * * *